UNITED STATES PATENT OFFICE.

ROBERT GROSS, OF RASTENBERG, THURINGIA, GERMANY, ASSIGNOR TO THE FIRM OF FERRO-PHOSPHAT-GESELLSCHAFT EMILIO SCHRAMM & CO., OF HAMBURG, GERMANY.

PROCESS OF MAKING MEDICINES.

No. 816,547.           Specification of Letters Patent.           Patented March 27, 1906.

Application filed June 6, 1904. Serial No. 211,445.

*To all whom it may concern:*

Be it known that I, ROBERT GROSS, a citizen of Germany, and a subject of the German Emperor, residing at Rastenberg, Thuringia, in the Empire of Germany, have invented certain new and useful Improvements in Processes of Producing Medicines, of which the following is a full, clear, and exact specification.

This invention relates to medical compounds to be used internally as a remedy for diseases of the stomach and bowels, heart disease, and fevers.

The compound is produced as follows: White phosphorus is burned under a glass bell, and the supply of air to support the combustion is restricted or limited to prevent complete oxidation and the production of phosphoric anhydrid. The product of partial oxidation settles in the glass bell in the form of white flakes, the color of which changes to yellow on exposure to the air. This yellow substance is then distilled in a retort, and the product in the receiver is a solid yellow substance and an oleaginous liquid, which is precipitated and separated from the yellow substance by decanting. The yellow substance has a slight odor of phosphorus and is not soluble in alcohol, ether, carbonic disulfid, and benzin. With sodium hydroxid the yellow substance develops hydric phosphide. Upon analysis it is found that the yellow substance consists of forty-seven to forty-eight per cent. phosphorus, the other constituent being forty-two to forty-three per cent. oxygen. Hence the formula will approximate $P_2O_4$. The well-known phosphorus tetraoxid has quite different properties, cannot be used as an internal remedy, and cannot be produced in the same manner as the foregoing. This yellow substance may be used as a remedial agent, or it may be boiled with Malaga or Burgundy wine until it is the consistency of syrup, when it may be used in variable doses.

By gradually adding to ferrum reductum a quantity of the yellow substance and heating the same at a temperature approximating 50° and maintaining this degree for several days and constantly stirring the mixture the ferrum reductum is completely transformed into a substance resembling resin and possessing an aromatic odor similar to hot honey. By boiling the resinous material in water a white powder is precipitated, which should be filtered and washed with boiling water. This product is approximately ferric phosphate.

The three substances may be used separately or may be combined or alternated in the treatment of the diseases referred to.

Having thus fully described my invention, what I claim as new, and desire to secure by Letters Patent, is—

The herein-described process of producing medicines, which consists in burning white phosphorus, collecting the products of combustion, distilling said products of combustion, separating the distillates, heating one of the distillates, stirring the same, and adding ferrum reductum thereto, substantially as described.

In witness whereof I subscribe my signature, in presence of two witnesses, this 13th day of May, 1904.

ROBERT GROSS.

Witnesses:
    E. H. L. MUMMENHOFF,
    OTTO W. HELLMRICH.